D. B. WILLIAMS.
WIRE REEL.
APPLICATION FILED NOV. 25, 1911.
1,031,155.
Patented July 2, 1912.
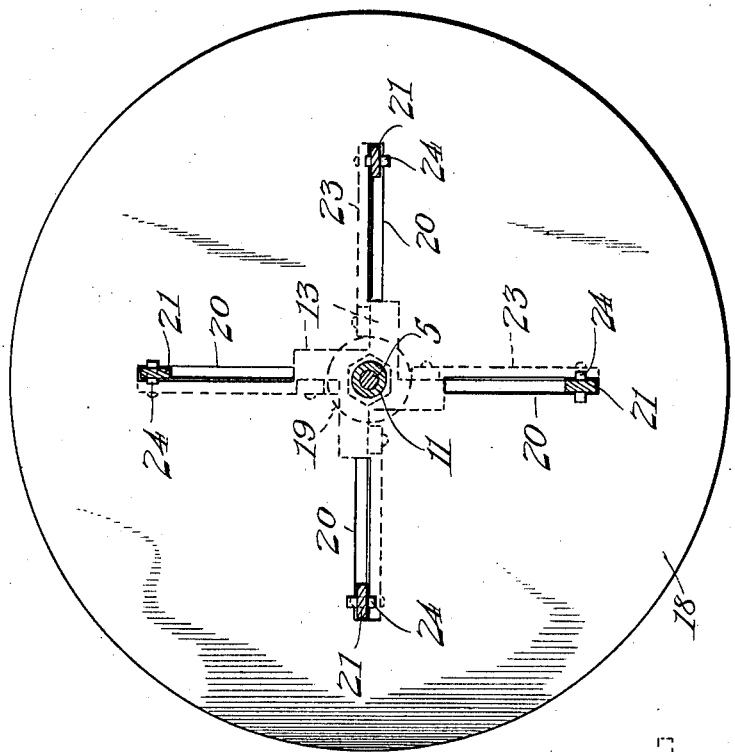
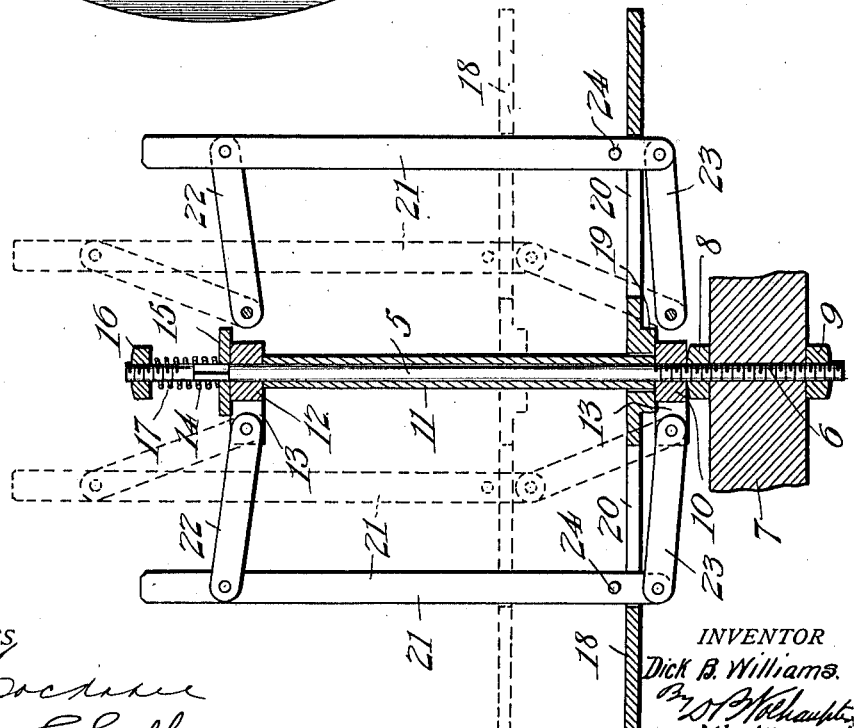
WITNESSES
INVENTOR
Dick B. Williams.
His Attorney

UNITED STATES PATENT OFFICE.

DICK B. WILLIAMS, OF NEW ORLEANS, LOUISIANA.

WIRE-REEL.

1,031,155.  Specification of Letters Patent.  Patented July 2, 1912.

Application filed November 25, 1911. Serial No. 662,310.

*To all whom it may concern:*

Be it known that I, DICK B. WILLIAMS, (whose full first name is DICK,) a citizen of the United States, residing at New Orleans, in the parish of Orleans and State of Louisiana, have invented certain new and useful Improvements in Wire-Reels, of which the following is a specification.

This invention relates to reels for holding rolls of wire or other material, and the principal object of the same is to provide a reel in which the material can be readily placed in position to be dispensed by rotating the reel, and also to provide means whereby the reel will immediately stop rotating when the strain, or pull, exerted to unwind the roll is removed, so that no more material is unwound from the reel than is desired.

The invention is of special utility in connection with bundling and similar machines wherein a sufficient length of the binder is unwound from the reel and wound about a bundle, and in this invention, means are provided for stopping the unwinding movement of the reel, when sufficient binding material has been removed, thereby placing a tension on the binder, so that the binder-tying operation is facilitated.

The invention also contemplates a reel that will hold the roll, or web, in position and which can be contracted to facilitate placing the roll in a dispensing position thereon, the reel being so constructed that the weight of the roll of wire will cause the reel to expand and enter into binding engagement with the roll and thereby prevent relative rotary movement of the reel and roll.

A simple and practical embodiment of the invention is shown in the accompanying drawings, wherein—

Figure 1 is a vertical sectional view of the improved reel, dotted lines being used to show the positions of the parts when contracted. Fig. 2 is a transverse sectional view taken on the line 3—3, Fig. 1. Fig. 3 is a detail plan view of one of the spiders forming a part of this invention.

Referring to the accompanying drawings, wherein like characters of reference designate corresponding parts, it will be seen that the improved reel comprises a shaft 5 having a threaded lower portion 6 that extends through a support 7 and is rigidly but detachably clamped thereto by the upper and lower nuts 8 and 9. A lower spider 10 is rotatable on the shaft 5 and seats on the nut 8, and an elongated sleeve 11 surrounds a portion of shaft 5 and bears on the spider 10. An upper spider 12 is rotatably mounted on the shaft 5 and seats on the upper end of the sleeve 11. The spiders 10 and 12 are duplicates in construction and each is provided with the radiating arms 13 that are preferably flat and integral with the bodies of the spiders.

The shaft 5 has a flat portion 14 at, or adjacent to its upper end, and a bearing washer 15, having a central opening corresponding to the contour of the flattened portion of shaft 5, is fitted over the shaft and rests on the upper spider 12. The upper end of the shaft 5 is threaded for the reception of an adjusting nut 16, and a spring 17 is coiled about shaft 5 between the nut 16 and the washer 15. It will be clear that the washer 15 can only move longitudinally of shaft 5, and that by manipulating the nut 16, the tension of the spring can be regulated to cause the washer 15 to have sufficient frictional engagement with the spider 12 to prevent free rotary movement of the reel.

A base or platform 18 surrounds the lower portion of sleeve 11 and has a pendent central collar 19 that seats on the lower spider 10. The platform 18 is provided with a plurality of radial slots 20 through which the carrying bars 21 project. These bars 21 project well above the platform 18 and have their upper portions pivotally connected to the upper radial arms of the spider 12 by means of the links 22. The lower ends of bars 21 project below the platform 18 and are pivotally connected to the radial arms of the spider 10 by means of the links 23. The bars 21 are provided with laterally projecting abutment lugs 24 at points slightly above the platform 18, and with which the platform 18 contacts when being lifted to cause the bars 21 to swing inward, as indicated by dotted lines in Fig. 1, thereby reducing the diameter of the reel so that a roll of wire can be readily placed thereon.

The platform 18 projects well beyond the bars 21 and forms a supporting base for the roll.

From the foregoing it will be clear that when the reel is contracted, and a roll placed therein, the roll bears on the platform, forcing the same downward and causes bars 21 to enter into firm engagement with the roll so that relative rotation is prevented. It will also be clear, that by adjusting the nut 16, the spring 17 forces the washer 15 into frictional engagement with spider 10 so that the reel will only rotate when wire is being pulled from the roll. The nut 16, the spring 17, and the washer 15, therefore perform all the functions of a brake which is at all times set so that a tension is maintained on the wire that is pulled from the roll.

While it has been found that this invention materially aids the operations of tying bundles, it is to be understood that such is but one of the many uses of the same, for it will be clear that the invention can be used in all cases where there is an occasion for supporting rolls or webs of material in position to be readily unwound.

What I claim as my invention is:—

1. A reel comprising an expansible and contractible roll holder, a rising and falling roll supporting platform loosely interlocked with the said holder.

2. A reel comprising an expansible and contractible roll holder including vertically arranged bars, and a separate horizontal rising and falling roll supporting platform loosely interlocked with said bars.

3. A reel comprising an upright shaft, an expansible and contractible roll holder mounted for rotation upon the shaft and including vertically arranged bars, and a separate horizontal roll supporting platform slidably supported upon the said shaft, and also having a loosely interlocked connection with the bars.

4. A reel comprising a shaft, upper and lower spiders thereon in spaced relation, a sleeve carried by the shafts and engaging the spiders, a platform surrounding the sleeve and resting on the lower spider, said platform being provided with radial slots, roll engaging bars projecting through the platform slots, and means for pivotally connecting the bars to the spiders.

5. A reel comprising a stationary shaft, means for locking the shaft to a support, spaced spiders rotatably mounted on the shaft, a sleeve carried by the shaft and interposed between the spiders, a platform mounted on and movable of the sleeve and resting on one of the spiders, the platform being provided with radial slots, roll-holding bars extending through the slots, means for pivotally connecting the end portions of the bars with the spiders, and means carried by the bars and adapted to be engaged by the platform for causing the bars to move longitudinally of and swing toward the shaft.

6. A reel comprising an expansible and a contractible roll holder, said holders including bars provided with abutment pins, a platform forming a roll-seat and slidable longitudinally of the bars, said platform being adapted to contract the holder by engaging the pins, and means for rotatably supporting the holder.

In testimony whereof I hereunto affix my signature in the presence of two witnesses.

DICK B. WILLIAMS.

Witnesses:
C. H. C. BROWN,
GEO. OLIVER.

Copies of this patent may be obtained for five cents each, by addressing the "Commissioner of Patents, Washington, D. C."